Jan. 19, 1960 G. A. LYON 2,921,816
WHEEL COVER
Filed Feb. 24, 1956 3 Sheets-Sheet 1
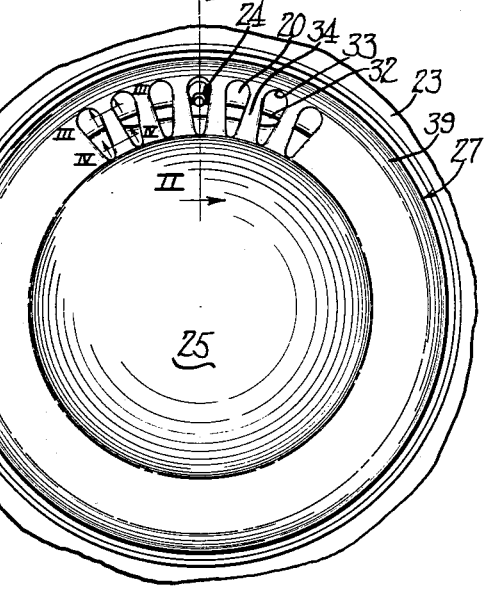
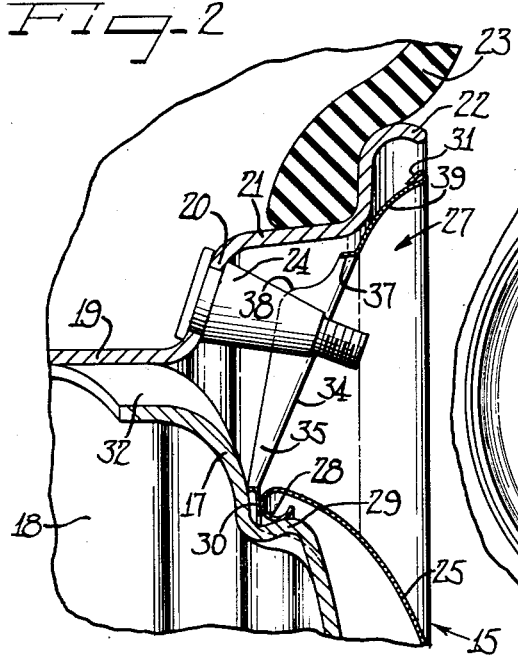
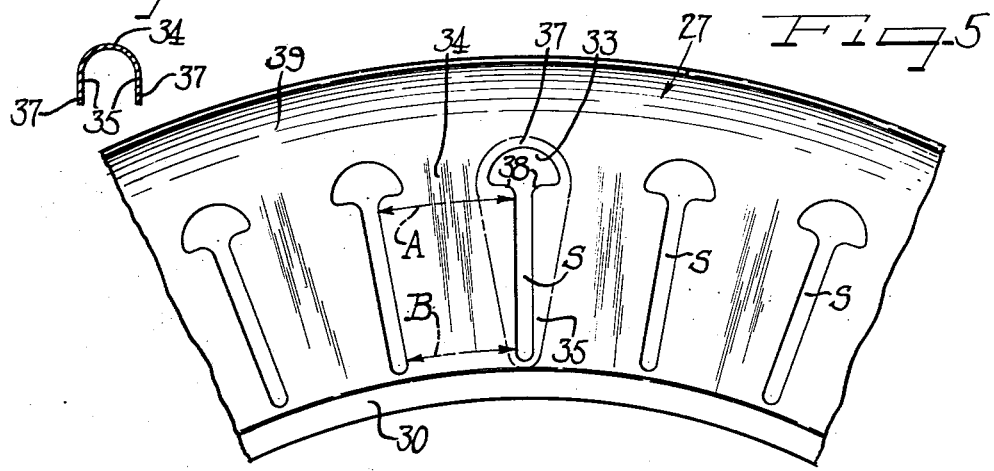
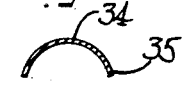
Inventor
George Albert Lyon Jan. 19, 1960 G. A. LYON 2,921,816
WHEEL COVER
Filed Feb. 24, 1956 3 Sheets-Sheet 2
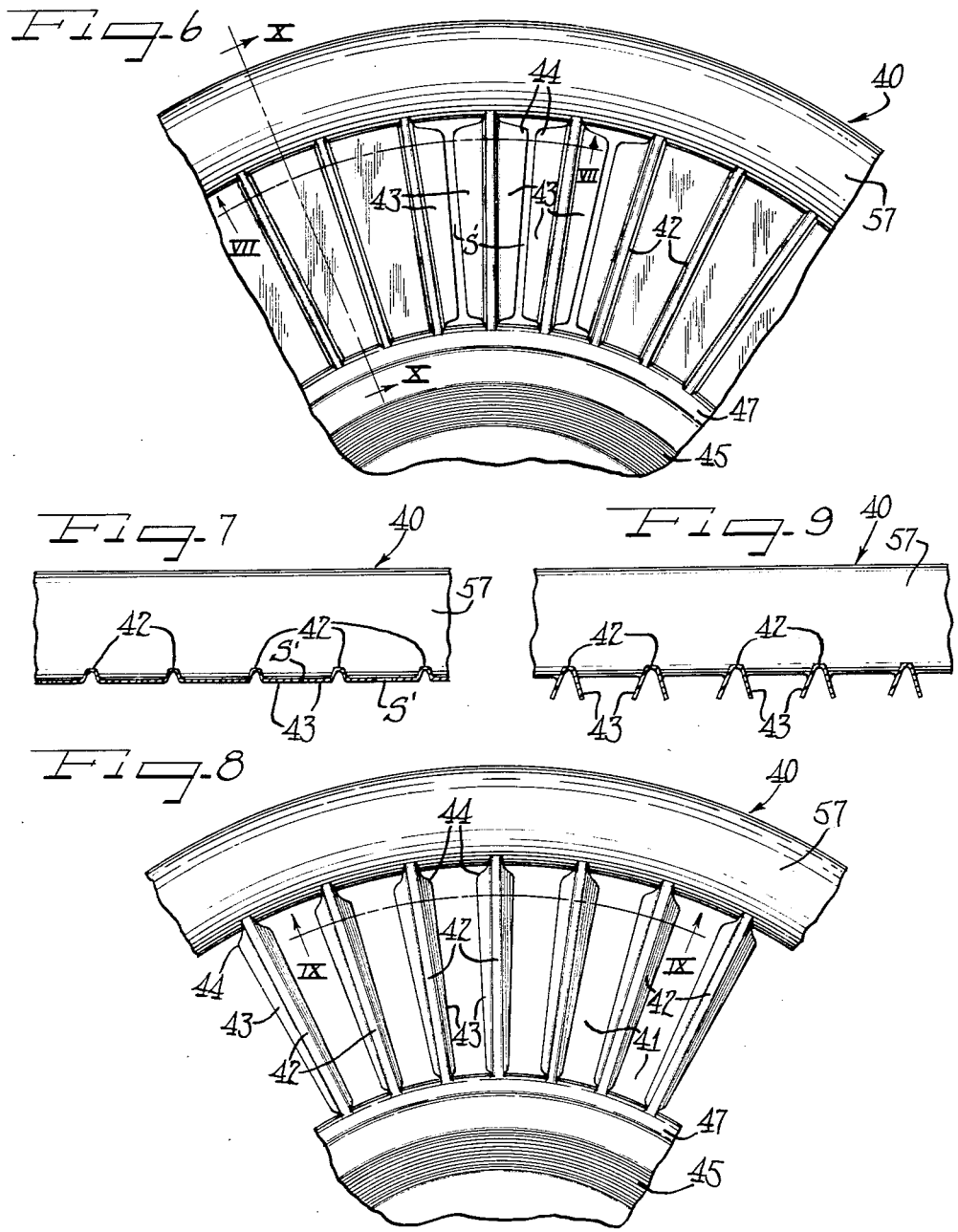
Inventor
George Albert Lyon Jan. 19, 1960 G. A. LYON 2,921,816
WHEEL COVER
Filed Feb. 24, 1956 3 Sheets-Sheet 3
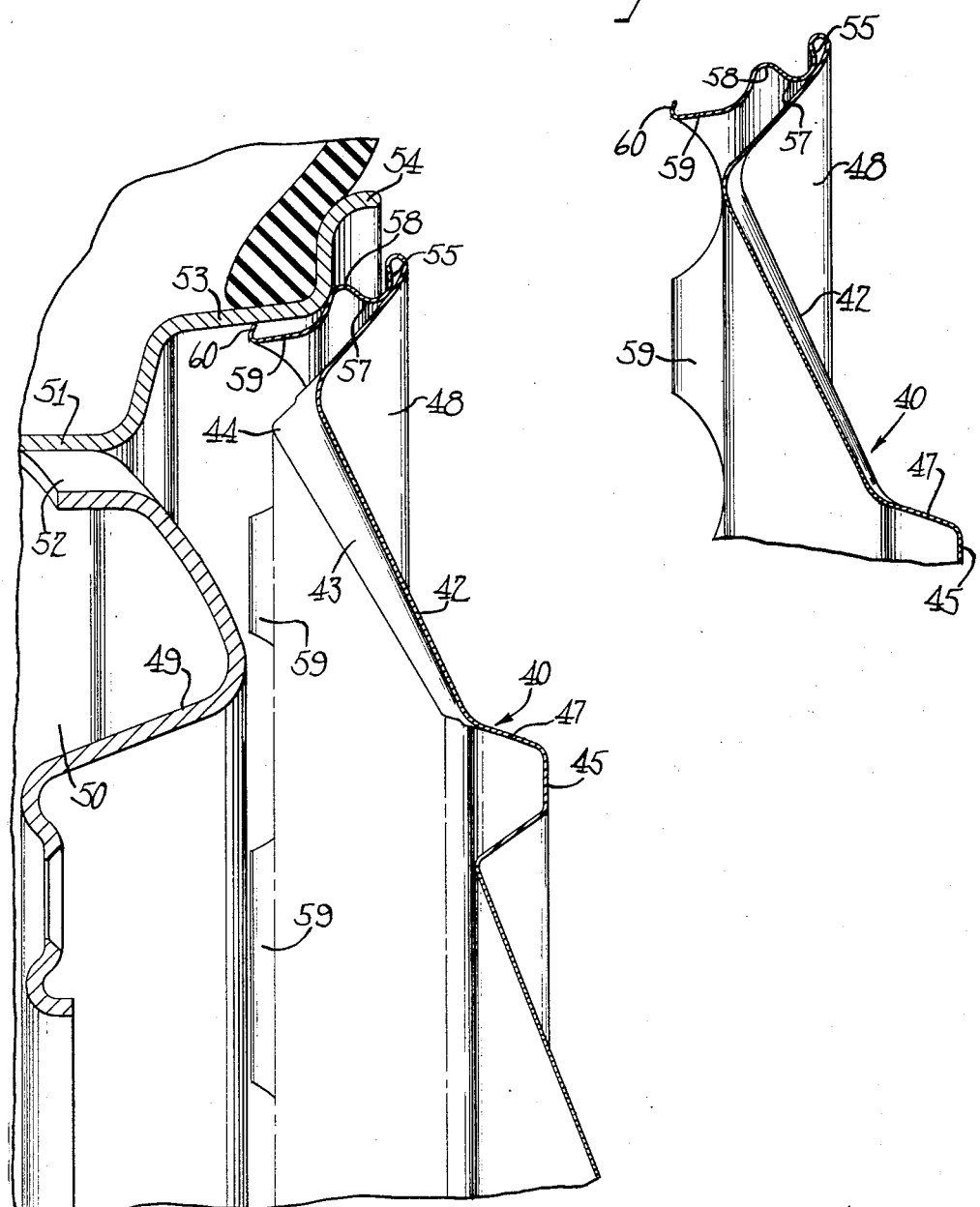
Inventor
George Albert Lyon

United States Patent Office 2,921,816
Patented Jan. 19, 1960

2,921,816

WHEEL COVER

George Albert Lyon, Detroit, Mich.

Application February 24, 1956, Serial No. 567,554

2 Claims. (Cl. 301—37)

The present invention relates to improvements in wheel structures and more particularly concerns the ornamental and protective covering of the outer sides of vehicle wheels such as automobile wheels.

For circulation of air as well as ejection of dirt it is often desirable to provide wheel covers with openings therethrough opposite the air circulation openings through the wheel. A desirable ornamental effect for such openings is in the form of simulated spokes of a wheel.

The normal arrangement of wheel spokes that radiate from a center or hub has the radially outer end portions of the spokes spaced substantially further apart than the radially inner ends by reason of the increase in diameter from the center toward the radially outer periphery of the circular structure.

It is, of course, desirable that the simulated spokes of a sheet metal wheel cover be transversely configurated to afford rib-like stiffness for substantial rigidity to compensate for the openings in the cover body. It is also desirable to have the simulated wheel cover spokes of maximum rigidity adjacent the radially outer marginal portion of the cover to withstand service conditions and handling of the cover. From an appearance standpoint, also, it is desirable to compensate for the greater spacing between the radially outer portions of the spokes by a greater depth of the sides of the spokes so as to foster the impression of strength and sturdiness of the structure.

It is, accordingly, an important object of the present invention to provide an improved wheel structure wherein a cover has a novel arrangement of spokes defining openings through the cover.

Another object of the invention is to provide an improved cover structure affording substantial openings therethrough for disposition opposite openings in a wheel and with the cover openings defined by spokes of maximum rigidity in the radially outer portions thereof.

A further object of the invention is to provide a wheel cover construction with alternating openings and spokes of improved appearance.

Still another object of the invention is to provide an improved method of making a wheel cover with spokes and openings through the cover.

It is a further object of the invention to provide an improved method of providing a sheet metal wheel cover with openings and alternating spokes of increased strength at the radially outer end portions thereof where the spacing between spokes is greatest.

Other objects, features and advantages of the present invention will be readily apparent from the following detailed description of certain preferred embodiments thereof taken in conjunction with the accompanying drawings, in which:

Figure 1 is an outer side elevational view of a vehicle wheel structure embodying features of the present invention;

Figure 2 is an enlarged fragmentary radial sectional detail view taken substantially on the line II—II of Figure 1;

Figure 3 is an enlarged sectional detail view taken substantially on the line III—III of Figure 1;

Figure 4 is an enlarged fragmentary sectional detail view taken substantially on the line IV—IV of Figure 1;

Figure 5 is a plan view of a portion of a blank from which the annular cover member of Figures 1 and 2 is made, illustrating steps in the method of making openings and alternating spokes in such cover member;

Figure 6 is a fragmentary outer side plan view of a modified cover illustrating steps in the method of providing the same with alternating openings and spokes;

Figure 7 is a fragmentary sectional detail view taken substantially on the line VII—VII of Figure 6;

Figure 8 is a fragmentary outer side elevational view of the cover of Figure 6 showing the same after completion of the alternating spoke and opening portion thereof;

Figure 9 is a fragmentary sectional detail view taken substantially along the line IX—IX of Figure 8;

Figure 10 is a fragmentary radial sectional view taken substantially along the line X—X of Figure 6; and Figures 11 is a radial sectional detail view of the cover of Figures 6 through 10 as applied to the outer side of a vehicle wheel.

Referring to Figures 1 and 2, a cover structure 15 is shown for disposition at the outer side of a vehicle wheel including a wheel body 17 of the disk spider type having an axially inwardly directed outer marginal attachment flange 18 secured to a base flange 19 of a tire rim. At the axially outer side of the base flange 19 the tire rim has a side flange 20 leading into an intermediate flange 21 which merges with a terminal flange 22. A pneumatic tire such as a tubeless tire 23 is adapted to be supported by the drop center, multi-flange tire rim, the side flange 20 carrying a valve stem 24.

In the present instance, the cover structure 15 comprises an assembly including a central hub cap member 25 and a radially outer annular trim ring cover member 27. At its outer margin the hub cap 25 is provided with an underturned resilient bead 28 engageable retainingly in snap-on, pry-off relation with retaining bumps 29 which may be constructed and arranged substantially in accordance with my Patent Re. 24105 of January 3, 1956.

The annular cover member 27 is of a diameter to extend from the hub cap 25 into substantial overlying relation to the tire rim. At its radially inner margin the cover member 27 has an annular flange 30 which is retainingly engageable in generally clamping relation by the resilient retaining bead 28 of the hub cap. At its radially outer extremity, the cover member 27 is adapted to lie in spaced relation to the terminal flange 22 and has an underturned bead-like finishing and reinforcing flange 31.

For circulation of air through the wheel and the cover suitable openings are provided therein. To this end, the wheel has a series of openings 32 which may be three or four in number afforded at insets in the attachment flange 18 adjacent juncture of the wheel body with the tire rim. Opposite the wheel openings 32, the cover member 27 is provided with an annular series of air circulation openings 33, such openings being herein of radially elongated generally tear drop shape with the largest width thereof at the radially outer end portions thereof. Separating and defining the sides of the openings 33 is a uniform series of spokes 34 which integrally connect in one piece the radially inner flange portion 30 and the radially outer marginal portion of the cover 27.

For strongly reinforcing the spokes 34 they are transversely arched and provided with generally axially inwardly turned respective side reinforcing flanges 35 derived from material struck out in providing the openings 33 and preferably uniformly connected entirely about the respective openings 33.

At their radially inner ends, the respective flanges 35 project axially inwardly beyond the inner marginal flange 30 of the ring cover member 27 so that the axially inwardly directed edges defining the radially inner portions of the flanges 35 engage under axially inward thrust against the wheel body under the compressive tension against the flange 30 by the hub cap bead 28 cammed tightly thereagainst by the interaction of the bead 28 with the retaining bumps 29 on the wheel. Thereby the flange edges engage substantially as spurs against the wheel body and hold the ring cover member 27 against turning relative to the wheel and thereby avoid distortion of the valve stem 24 extending through one of the openings 33.

As best seen in Figures 2 and 3, the reinforcing flanges 35 are of maximum width and rigidity adjacent the radially outermost ends of the spokes 34 where the spokes are narrowest. The radially outer narrower shape of the spokes is due to the generally tear drop shape of the cover openings 33 which are widest in their radially outer end portions, thus affording advantageous air circulation relationship with respect to the wheel openings 32. However, for practical considerations in manufacture, and also to facilitate air circulation through the openings 33, the radially outermost yoke portions identified at 37 of the flanges 35 are relatively narrow while the maximum width portions of the flanges 35 at each side of the narrowest dimension of each of the spokes 34 project axially inwardly substantially lobe-like as at 38. As a result of this construction, while the spokes 34 are shallowest at their widest radially inner portions as best visualized in Figures 1 and 4, and are narrowest in the radially outer end portions thereof as best visualized in Figures 1 and 3, the greatest depth of the spokes 34 is in the narrowest portions thereof. This is desirable not only from the rigidifying aspect, but also as an ornamental consideration. When viewing the cover from the outer side, and especially at an angle to the axis of the cover, the depth of the spokes at the narrowest portion thereof affords the appearance of durability and strength and minimizes the appearance of empty space behind the cover as seen through the openings 33.

Steps in the method of making the openings 33 and shaping the spokes 34 to attain the desirable results of the present invention are depicted in Figure 5. As the first step, generally keyhole shaped slots S are formed in the body of the member 27 which may comprise any suitable sheet metal such as stainless steel, brass, aluminum, or the like rolled or stamped into the preferred cross-sectional shape of the cover member. The continuous edge defining the slot S in each instance, provides the outline for the edge of the flange 35 thereafter pressed axially inwardly by suitable punch and die mechanism on the symmetrical dot dash outline shown about one of the slots S in Figure 5.

By having the opposing longitudinal, that is, radially extending, edges defining the slots S disposed in parallel relation, it will be observed upon comparison of the lengths of dimension lines A and B between respectively the radially outer end portions and the radially inner end portions of the narrow extents of adjacent slots S, that there is actually more material to be formed into the spokes 34 adjacent the radially outer ends thereof than adjacent the radially inner ends thereof. Hence, after the flanges 35 have been bent to shape to provide the generally tear drop openings 33, the amount of material in the narrowest or radially outermost portions of the spokes 34 being greater than at the radially innermost and wider portions of the spokes substantially compensates for the differential in width of the spokes and thus affords substantially uniform strength for the spokes which, if anything, is greatest in the narrowest portions of the spokes.

It should also be noted that although the radially outer end portions of the slots S are of generally mushroom head shape so as to afford a narrowing of the flange 35 in the yoke portion 37 about the radially outer widest end portion of each of the slots 33, there is no weakening of the radially outer end extremity portions of the spokes 34 since the widest wing portions 38 of the flange 35 are alongside the narrowest portions of the spokes and radially outwardly beyond the wing portions 38 they join in mutually reinforcing relation with the flange yoke portion 37 on the radially outer extremities of the spokes 34 where they respectively diverge circumferentially to merge with one another and with the radially outermost portion of the cover member 27. For additional rigidity, it will be observed that the radially outermost continuous annular portion of the cover member 27 is in the form of a reinforcing rib 39 in the present instance of dished form. At the radially inner ends of the spokes 34, the angularly related annular inner terminus flange 30 affords an adequate degree of reinforcement.

It will also be observed that not only at the radially inner extremities of the slots S, but at all radially outer extremity portions thereof in the mushroom head openings thereof the angular edges are on respective radii. Thereby, in pressing and drawing the flange 35 tearing of the flange at any angular portion thereof is avoided.

In a modification of the invention as embodied in a full disk cover 40, depicted in Figures 6 through 11, spokes similar to the spokes 34 and constructed in the same manner could be provided. However, by employing substantially the same method as in forming the spokes 34 and the openings 33, the cover 40 is provided with a series of openings 41 defined by respective generally radially extending spokes 42 in a uniform annular series in an intermediate portion of the cover 40 which is constructed from a plate or blank of sheet metal by suitable draw press operations. Stainless steel, brass, aluminum or other suitable material may be employed in making the cover 40.

In making the openings 41 and the spokes 42 (Figs. 6 and 7), the spokes 42 may be initially pre-defined by embossment of the crowns or crests thereof radially across the intermediate portion of the cover plate. Then the solid areas of the intermediate portion between the spoke crests are provided with longitudinal central slots S' defined by opposed parallel radially extending longitudinal edges merging at their respective radially inner and outer ends with enlargements of the slot in each instance alongside of the adjacent ends of the spokes 42. By such formation of the slots S', the material between the spokes 42 is divided into respective flanges 43 which taper toward greatest width from a narrower width at the radially inner ends thereof to the radially outer ends thereof. Upon bending of the flanges 43 generally axially inwardly, and in the present instance into a diverging relationship as best seen in Figures 8 and 9, the greatest amount of material and thus maximum strength is in the radially outermost portions of the spokes 42 where desirably the greatest strength is provided. It will be noted that the radially outer end portions of the flanges 43 provide wing-like terminals 44 similar to the wing-like portions 38 of the spoke flanges 35 in Figure 2.

In the present instance the cover 40 is of the self retaining type, comprising a central crown portion 45 having an annular angular side flange 47 with which the radially inner ends of the spokes 42 merge in substantially rigid fashion. From the crown side flange 47 the spokes 42 preferably extend generally radially outwardly and axially inwardly and merge at their radially outer ends in substantially rigid fashion with an annular continuous generally rib-like outer marginal cover portion 48.

The central crown portion 45 of the cover and the adjacent portions of the spokes 42 are adapted to overlie a wheel body 49 having an annular outer marginal attachment flange 50 secured to a base flange 51 of a tire rim and providing at juncture with the tire rim air circulation wheel openings 52. The openings 41 of the cover between the spokes 42 lie opposite the wheel openings 52 as best seen in Figure 11. The radially outer marginal portion 48 of the cover is adapted to overlie the tire rim and more particularly an intermediate flange 53 and a terminal flange 54 thereof.

For retaining the cover on the wheel, the outer marginal portion 48 is preferably provided with retaining structure therebehind engageable with the tire rim. To this end, an underturned flange 55 is provided as an extension of the marginal portion 48 and engages against the back of the radially outer portion of the cover portion 48. Extending generally axially inwardly as an extension of the underturned flange 55 is an annular continuous flange 57 provided intermediately with an annular generally radially outwardly bulging seating and reinforcing rib 58 engageable upon the shoulder at juncture of the terminal flange 54 with the intermediate flange to determine the axially inward disposition of the cover. At suitable intervals such as from 8 to 16, retaining finger extensions 59 are provided from the axially inner portion of the axial flange 57 which are adapted to generally telescopically extend into the axially outer portion of the intermediate flange 53. At their extremities, the finger extensions 59 are provided with short and stiff generally radially and axially outwardly oblique retaining terminals 60 that engage firmly grippingly edgewise against the inner face of the intermediate flange 53 and in so doing place the retaining fingers 59 and the adjacent portions of the flange 57 under resilient tension whereby to effect a radially outward gripping thrust upon the retaining fingers 60.

It will be observed that application of the cover 40 to the outer side of the wheel is by pressing the same axially inwardly onto the wheel. Removal of the cover 40 from the wheel is effected by application of a pry-off tool between the tire rim terminal flange 54 and the reinforcing and seating rib shoulder 58 on the retaining flange structure of the cover and effecting pry-off force.

It will be appreciated, of course, that although the structure and the method described in connection with the cover member 27 is in a trim ring, and the method and structure described in connection with the cover 40 is in a full disk wheel cover, the structure and method relating to formation of the openings in the cover and the spokes thereof are interchangeably adaptable to either a full disk or a trim ring type of cover.

It will be understood that modifications and variations may be effected without departing from the scope of the novel concepts of the present invention.

I claim as my invention:

1. In a wheel structure including a wheel body and a tire rim with air circulation openings adjacent juncture of the body and rim, a cover for disposition over the outer side of the wheel including a cover body having an annular portion thereof provided with generally radially elongated openings for disposition opposite the openings in the wheel, said openings in the cover being defined and separated by generally radially extending spokes connecting continuous annular portions of the cover at the radially inner and outer ends of the openings, said spokes having maximum material in the radially outer end portions thereof for greatest strength in such radially outer end portions adjacent the radially outer annular portion of the cover, said radially inner annular portion of the cover member being an annular flange having an inner edge of a diameter to fit about cover retaining bumps on the wheel body, and a hub cap engageable upon the wheel body about said bumps and having a beaded edge clampingly engageable with said radially inner cover portion for thrusting said radially inner cover portion toward the wheel body, the radially inner end portions of the spokes having generally axially inwardly extending flange portions thereof thrusting grippingly against the wheel body and thereby holding the cover member against turning relative to the wheel so as to avoid twisting of a valve stem that may project through one of said openings from the tire rim.

2. In a wheel structure including a tire rim and a wheel body supporting the tire rim and providing adjacent juncture with the tire rim a circumferentially spaced series of air circulation openings through the wheel, a circular wheel cover member for overlying disposition to both the tire rim and the wheel body, means removably securing the cover member in said overlying disposition, the cover member having a circumferentially spaced series of numerous radially elongated openings intermediate radially inner and outer annular portions of the cover member which are connected together integrally by spoke portions intervening between the cover openings, the radially inner ends of the cover openings being over the wheel body, the radially outer ends of the cover openings being over the tire rim, most of the cover openings overlying the wheel openings for air circulation through the wheel and the cover and the radially outer end portions of the cover openings being disposed radially outwardly beyond the wheel openings to facilitate such air circulation, said cover openings being of maximum width adjacent to their radially outer ends whereby further to facilitate air circulation, each of said cover openings being defined by generally axially inwardly projecting longitudinally extending flanges of progressively greater width from the radially inner ends to the radially outer end portions of the cover openings so that the flanges are of maximum width adjacent to the radially outer ends of the cover openings for affording maximum reinforcement for the spokes where the cover openings are widest, said flanges having at their radially outer ends wing terminals directed generally radially outwardly and joining the radially outer ends of the spokes reinforcingly at juncture of the spokes with the radially outer annular portion of the cover member.

References Cited in the file of this patent

UNITED STATES PATENTS

| | | |
|---|---|---|
| 2,130,207 | Van Halteren | Sept. 13, 1938 |
| 2,148,213 | Lyon | Feb. 21, 1939 |
| 2,160,272 | Kranz | May 30, 1939 |
| 2,196,020 | Lyon | Apr. 2, 1940 |
| 2,544,703 | Lyon | Mar. 13, 1951 |
| 2,544,705 | Lyon | Mar. 13, 1951 |